F. W. HARRIS.
METHOD AND APPARATUS FOR DEHYDRATING PETROLEUM EMULSIONS.
APPLICATION FILED MAY 13, 1918. RENEWED MAY 31, 1921.
1,405,122. Patented Jan. 31, 1922.
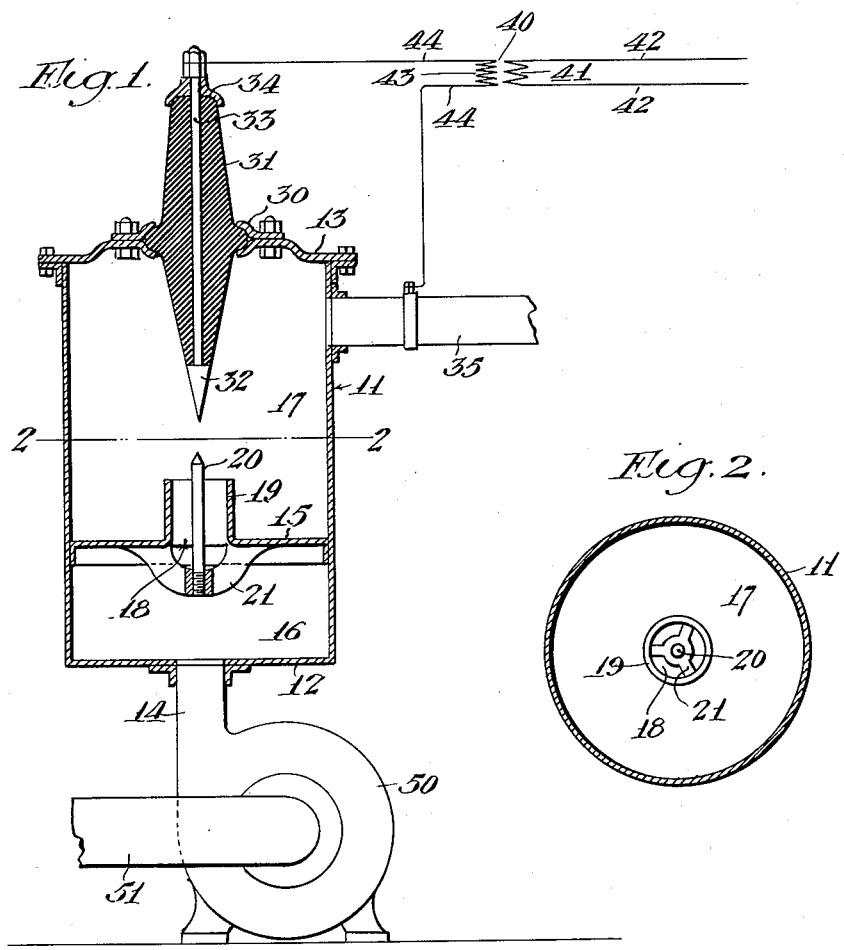
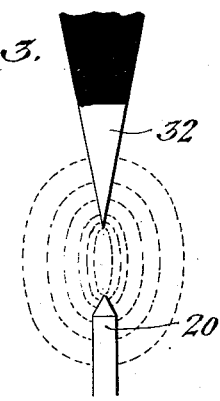

UNITED STATES PATENT OFFICE.

FORD W. HARRIS, OF LOS ANGELES, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

METHOD AND APPARATUS FOR DEHYDRATING PETROLEUM EMULSIONS.

1,405,122.  Specification of Letters Patent.  Patented Jan. 31, 1922.

Application filed May 13, 1918, Serial No. 234,325. Renewed May 31, 1921. Serial No. 473,768.

*To all whom it may concern:*

Be it known that I, FORD W. HARRIS, a citizen of the United States, residing in Los Angeles, county of Los Angeles, and State of California, have invented a new and useful Method and Apparatus for Dehydrating Petroleum Emulsions, of which the following is a specification.

My invention relates to the art of separating water from petroleum oils with which it is often found associated in nature. Water is often found in such oils in a more or less finely divided and emulsified condition. As many petroleum oils have a specific gravity at ordinary temperatures at or near the specific gravity of water it is sometimes quite difficult to separate the emulsion found in such oils by ordinarily settling methods and this difficulty is greater as the oil gets heavier and the water more finely divided. In the art it has become common to speak of the water in oil as "trapped water" and "free water."

Trapped water is that which is so fine that it will not settle from the oil in a reasonable time, say twenty-four hours by ordinary settling and free water is that which will so settle. There is no fine line of demarcation between the two classes of water, the terms expressing merely a difference in fineness of the water globules, but the terms "free water" and "trapped water" are convenient ones and will be used hereinafter in the above defined sense.

The art of separating water from oil necessitates causing the trapped water particles to agglomerate into larger free water particles, and it is to this step that my invention relates. It has been known for a considerable time that such an agglomeration takes place whenever an electric current is passed through the body of an oil containing trapped water, and my invention depends on this principle.

I have found that this agglomerating action is practically instantaneous, the agglomeration taking place as soon as the mixture of oil and water is subjected to the action of the electric current and that as soon as the electric current has established a path through such a mixture that any further passage of the current is of no value and merely serves to waste energy. I have found further that large quantities of mixture can be readily treated in the apparatus disclosed herein when operated in accordance with the following specification:

My invention differs from the previous attempts to dehydrate mixtures in that it utilizes a very concentrated electric field of small area and passes the mixture of oil and water to be treated through this field at a high speed. An apparatus which may be used to carry on my method is illustrated in the annexed drawing in which Fig. 1 is a section through the center of such an apparatus and Fig. 2 is a section on a plane indicated by the line 2—2 of Fig. 1. Fig. 3 is a diagram illustrating the theory involved.

The apparatus illustrated consists of a cylindrical shell 11 having a tight bottom 12 and a tight top 13. An inlet pipe 14 is connected into the bottom 12 and a partition 15 divides the interior of the shell into a lower space 16 and an upper space 17. Secured about an opening 18 in the partition 15 is a nozzle 19 having a lower electrode 20 fixed therein and held by three ribs 21 between which the mixture may readily pass.

Secured in a flange 30 to the top 13 is an insulator 31. An upper electrode 32 is secured in gas tight relationship in the insulator 31 by means of a rod 33 and a cap 34, the rod 33 serving to electrically connect the cap 34 with the upper electrode 32. An outlet pipe 35 connects into the side of the shell 11 and serves to conduct fluid away from the space 17.

A transformer 40 is used, the low tension winding 41 of which is connected through wires 42 with a source of alternating current not shown and the high tension winding 43 of which is connected through wires 44 with the cap 34 and the pipe 35 or some other portion of the shell 11 or its connected structure.

Mixture may conveniently be forced through the above described apparatus by a centrifugal pump 50 which takes in mixture through a pipe 51 and discharges it through the pipe 14.

The method of operation of my invention is as follows:

The mixture of oil and water being fed into the pump 50 through the pipe 51 is fed through the pipe 14 into the lower chamber 16 under some pressure and is forced to flow through the nozzle 19 around the lower electrode 20 forming a fairly uniform body of moving liquid. This body of moving liquid impinges on the upper electrode 32 and flows upwardly around this electrode completely surrounding same and providing a rapidly moving envelope which surrounds the upper electrode. The agglomerated water and the oil are continuously taken from the space 17 by the pipe 35.

During its passage between and around the electrodes 20 and 32 the mixture is subjected to the action of an electric field. The possible direction of the current flow in this field is indicated in Fig. 3, although I am not certain that this figure correctly shows such a field. I am certain, however, that current will flow through the liquid between the electrodes and that a very perfect agglomeration of the trapped water takes place as a result thereof. This agglomeration depends in a great measure on the proportion of the various parts. For example, I have found that operating on twelve gravity Beaumé oil that it is desirable to heat the oil to about 170 degrees Fahrenheit, and that a nozzle 19 having a maximum diameter of two and one quarter inches should be used to take care of a flow of twenty-five barrels an hour. If the speed of the liquid be increased the efficiency of the apparatus will be even better, but if it be materially decreased the proportion of trapped water passing through the pipe 35 will rise. Where smaller rates of flow are desired a smaller nozzle must be used. With apparatus arranged as above the potential employed will depend on the amount of total water in the mixture. With a mixture containing heavy oil and forty per cent of water a voltage around five thousand will be found convenient and efficient while with a mixture which contains only ten per cent water a voltage of fifteen thousand may be desirable. Lighter oils will require lower voltages. Under either of these sets of conditions a separation of the electrodes of from three to eight inches may be used, that is the distance between the tips of the electrodes 32 and 20 may be somewhere between three and eight inches.

It will be found by calculating the velocity obtained under the above conditions that the fluid should be moved in the neighborhood of the electrodes at a velocity not much below 500 feet per minute, and this is very important if a low current consumption and high efficiency of agglomeration is to be attained.

My invention therefore resides particularly in the use of stationary electrodes having points which are opposed to each other thus producing a concentrated field. It resides further in passing the mixture to be treated through this field and around the electrodes in such a manner as to prevent the current path from passing through other media than the the moving stream. It consists further in maintaining the speed of the moving mixture at or near 500 feet per minute.

I claim as my invention:

1. An apparatus for dehydrating emulsions comprising a container and a pair of electrodes in axial alignment within said container, insulating means between the container and one of said electrodes, a conduit to said container adapted to direct the inflow of the emulsion parallel with said axis and is thus exposed to the electric field between said electrodes, and inlets and outlets for said emulsion.

2. An apparatus for dehydrating emulsions as set forth in claim 1 and provided with means whereby said emulsion is retained under pressure above the atmosphere while in the container.

3. An apparatus as set forth in claim 2 wherein one of the electrodes and the said conduit have the same axis and the inflowing oil surrounds said electrode.

4. The method of agglomerating water particles in a crude oil emulsion which consists of passing said emulsion through a conduit in which an electrode is axially disposed and then passing said emulsion into an electric field formed between said electrode and a second electrode.

5. The method as set forth in claim 4 wherein said emulsion is subjected to a pressure above the atmosphere during said treatment.

In testimony whereof, I have hereunto set my hand at Los Angeles, California, this 6th day of May, 1918.

FORD W. HARRIS.